United States Patent [19]

Beech

[11] Patent Number: 5,027,210

[45] Date of Patent: Jun. 25, 1991

[54] NOISE REDUCTION IN HIGH DEFINITION TELEVISION SIGNALS

[75] Inventor: Brian H. Beech, Bishopstroke, United Kingdom

[73] Assignee: National Transcommunications Limited, Winchester, England

[21] Appl. No.: 375,005

[22] PCT Filed: Mar. 30, 1988

[86] PCT No.: PCT/GB88/00242

§ 371 Date: Jun. 16, 1989

§ 102(e) Date: Jun. 16, 1989

[87] PCT Pub. No.: WO88/07800

PCT Pub. Date: Oct. 6, 1988

[30] Foreign Application Priority Data

Mar. 30, 1987 [GB] United Kingdom ............... 8707533

[51] Int. Cl.$^5$ .................. H04N 5/14; H04N 5/208; H04N 5/213
[52] U.S. Cl. .................................. 358/166; 358/167
[58] Field of Search .................. 358/166, 36, 37, 167

[56] References Cited

U.S. PATENT DOCUMENTS 3,288,930 11/1966 Johnson ........................... 381/94
3,333,055 7/1967 Krause ............................ 358/167
4,520,396 5/1985 Dischert et al. ................. 358/167
4,668,988 5/1987 Sasaki ............................. 358/166
4,849,826 7/1989 Ohta ............................... 358/166

FOREIGN PATENT DOCUMENTS 6010925 1/1985 Japan ............................... 358/167

OTHER PUBLICATIONS

N. H. K. Technical Monograph, No. 32, Jun., 1982; J. Ishida; p. 6269.

Primary Examiner—James J. Groody
Assistant Examiner—Wendy R. Greening
Attorney, Agent, or Firm—Watson, Cole, Grindle & Watson

[57] ABSTRACT

In a high definition multiplexed analog component system, a high definition signal is processed by splitting it into high and low frequency components and pre-emphasizing the high frequency component with a non-linear characteristic and at the receiver a complementary de-emphasis process is applied to produce a noise-reduced high definition signal compatible with existing conventional receivers. A processor of a pre-connector for the high definition signal can be used for intersample interference due to non-compatibility between the pre and de-emphasis characteristics in a digital implementation of the system.

22 Claims, 10 Drawing Sheets

$Vb$ = BIAS VOLTAGE
$Ib$ = BIAS CURRENT $\underline{V = Ib \times R_L}$

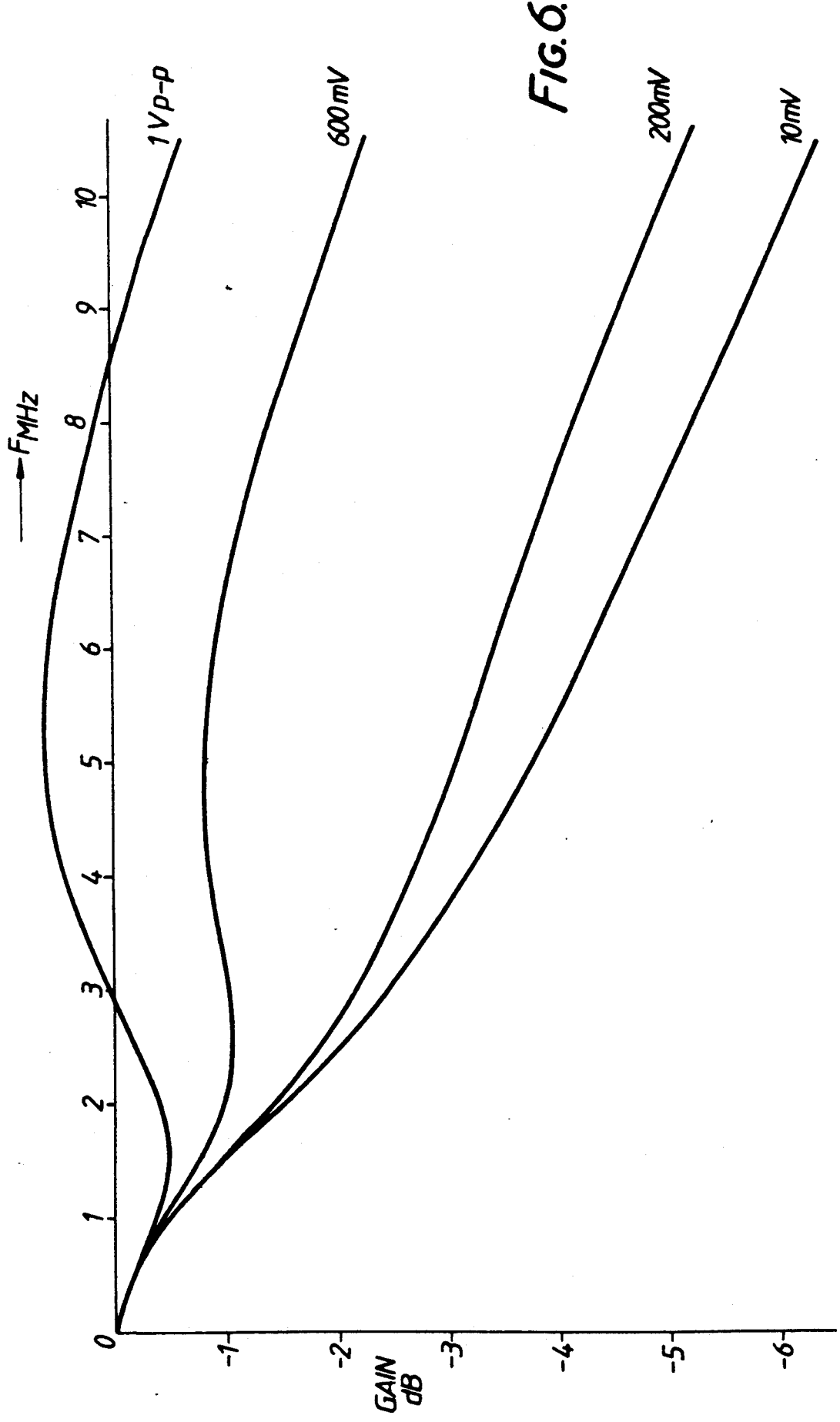

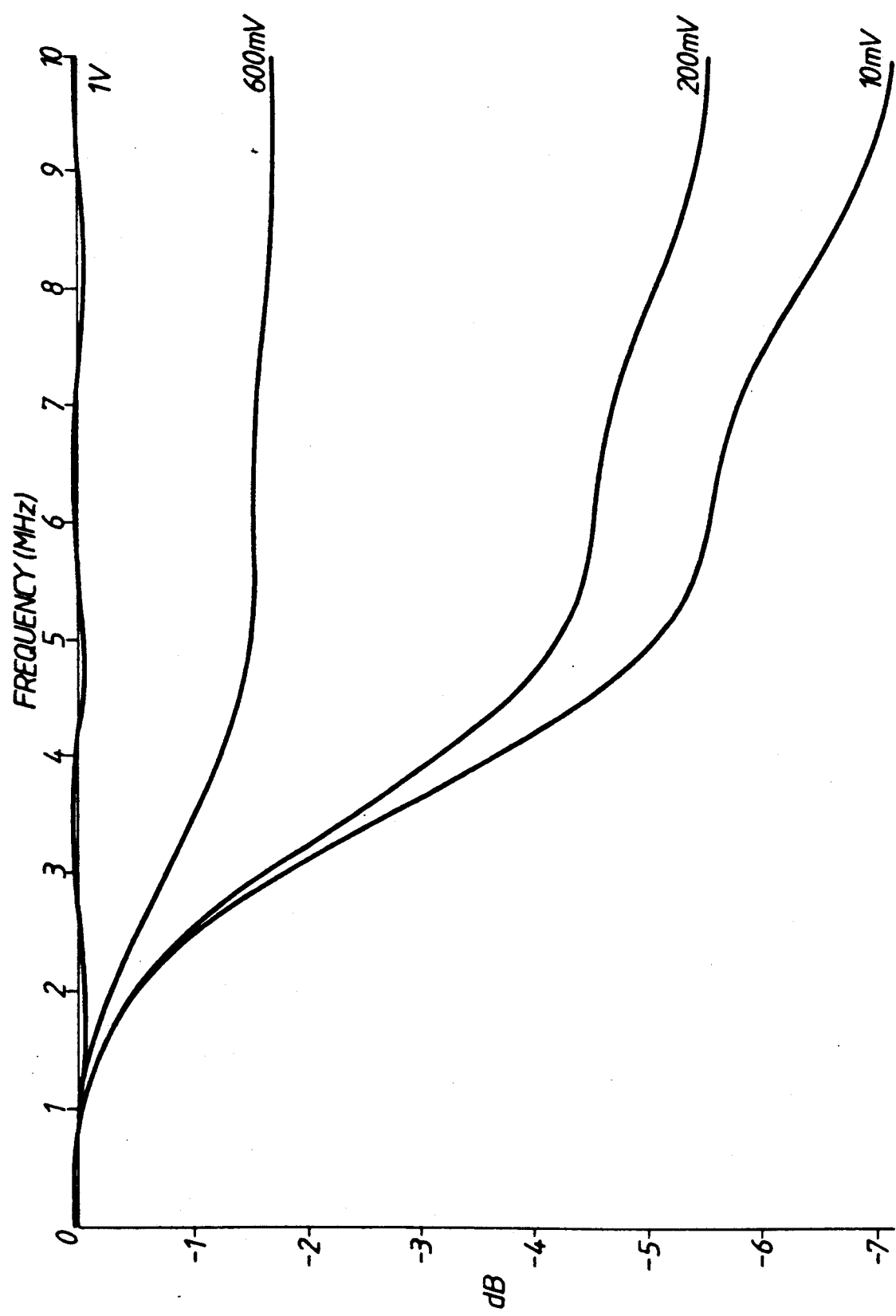

NOISE REDUCTION IN HIGH DEFINITION TELEVISION SIGNALS

BACKGROUND OF THE INVENTION

1. Field of the Invention

The present invention relates to noise reduction in television signals, in particular to noise reduction in high definition television signals such as, the example, High Definition Multiplexed Analogue Component (HD MAC) television signals transmitted as F.M.

2. Related Problems

High definition television signals have increased noise problems over conventional T.V. signals. For example, in HD MAC, picture signals transmitted for T.V. Pictures having a 5:3 "wide aspect" ratio have increased noise problems due to an increase in the signal baseband width, an increase in the de-compression ratio and the reduction of the viewing distance from 4 H to 3 H (where H=height of T.V. screen).

It would be desirable to apply noise reduction techniques to a high definition signal, in order to ensure that the reproduced signal is of satisfactory quality.

A further problem in this respect relates to the fact that in some cases it may be desirable to transmit a high definition T.V. signal together with a conventional signal, in the form of a "compound" signal. An example is HD MAC, which is, in fact, comprised of a conventional MAC signal together with additional information necessary to make up the high definition signal. A conventional MAC receiver will just utilise the conventional MAC signal, whereas a receiver adapted for HD MAC will utilise the complete signal to reproduce the high definition picture and sound.

Any noise reduction technique applied to reduce the added noise problems of a high definition signal should, therefore, be such as not to affect undesirably any conventional signal transmitted with the high definition signal in a compound signal, ie compatibility with transmission and processing of conventional signals such as may be processed by already existing techniques, needs to be ensured.

SUMMARY OF THE INVENTION

The present invention provides a method of processing a high definition television signal, comprising the steps of filtering the signal to give a high frequency sub-band and a low frequency subband, applying a non-linear pre-emphasis to the high frequency sub-band, re-combining and transmitting the signal, receiving the signal, filtering the received signal to provide high frequency and low frequency sub-bands, and applying a non-linear deemphasis to the high frequency sub-band.

The non-linear pre and de-emphasis applied to the high frequency sub-band advantageously gives adequate noise reduction to a high definition television signal to give an acceptable received signal.

Further, the frequency split and non-linear function are preferably arranged such that any conventional signal transmitted with the high definition signal is substantially unaffected by the processing, in the sense that the conventional signal may still be acceptably reproduced on a conventional receiver which is not arranged to be able to process a high definition signal. This is because in "compound" signals, such as HD MAC, it is only necessary to process the lower frequency transmitted signal in order to reproduce the conventional signal (below 8.4 MHz in the case of HD MAC), so that pre and de emphasis on the higher frequency band will not have a great deal of effect on the conventional signal.

The fact that the low frequency band does not have the pre/de emphasis characteristic applied thereto results in no appreciable degredation of the high definition signal either, as both noise and adjacent channel interference increase as frequency increases, and it is therefore the higher frequencies which are the most crucial as regards the noise in the transmitted signal.

The filter characteristics applied to the signal are chosen bearing in mind the effect on compatibility with conventional processing as against noise reduction effects for the high definition signal. The more of the signal is filtered for pre-emphasis (and noise reduction) the more compatibility is likely to be effected. A compromise is necessary.

The present invention further provides a receiver circuit comprising filter means arranged to split a high definition television signal into high and low frequency sub bands, and means for applying a non-linear de-emphasis characteristic to the high frequency sub-band.

The non-linear pre/de-emphasis characteristic applied is preferably such that a maximum amplitude voltage signal is unaffected. For example, in HD MAC, with IV being the maximum, a IV multiburst input having the pre-emphasis of the present invention applied to it will come out as a IV multiburst. As the amplitude decreases the amount of pre-emphasis applied will increase, and vice versa for the de-emphasis characteristic.

The non-linear characteristic is further preferably arranged such that its effect is symmetric independent of static deviation, such that noise conversion effects due to static deviation are elimitated.

Further, at high input levels the non-linear characteristic is preferably arranged to become linear, such that threshold spikes pass through relatively undistroted, and the system therefore does not introduce any worsening to F.M. threshold.

The non-linear characteristic (voltage in/voltage out) is preferably arranged in the form of a three part curve having a middle and two ends, the middle having a certain slope value and the two end portions having slope values which are the same as each other but which are different from the slope value of the middle portion. This non-linear characteristic may be arranged as a piece wise linear function (three straight parts put together). However, we have found that more benefits accrue of the function is formed as a continuous curve.

The present invention can be implemented via either digital or analogue processing techniques, A problem in either technique is that it is desirable to ensure that both the pre and de-emphasis characteristics are complementary (ie "mirror" images of each other), otherwise errors will be introduced by the processing.

In the analogue processing technique we have found that it is possible to ensure complementary pre and de-emphasis by utilising a feedback loop for applying the pre-emphasis to the signal, the feedback loop including a characteristic corresponding to the de-emphasis characteristic to be applied.

The present invention further provides analogue pre-emphasis circuitry for applying non-linear preemphasis to a high definition television signal, the circuity comprising a feedback loop which includes means for applying a de-emphasis characteristic to the fedback signal, the de-emphasis characteristic corresponding to the de-emphasis characteristic to be applied to the pre-emphasised signal after processing by the pre-emphasis circuitry.

In the digital processing technique it is theoretically not possible to ensure complementary pre and de-emphasis merely by utilising digital pre and de-emphasis circuitry. With straightforward pre and de-emphasis circuits there will always be some error. However, we have found that, because it is possible to quantify the amount of error generated by the non-complementory pre and de-emphasis circuits, it is also possible to design a transfer function to correct for the error, which transfer function can preferably be applied as a "pre-corrector" prior to pre-emphasis being applied.

It is possible that the transfer function necessary for the pre-corrector could be implemented by means of a digital filter with non-linear co-efficients. The filter necessary to implement such a transfer function would be extremely complex, and such a filter has not yet been designed.

We have found that the pre-corrector function can be realised by very simple means.

The present invention further provides a pre-corrector circuit, for applying pre-correction to a high definition television signal prior to digital pre-emphasis, the circuit comprising filter means for applying at least two separate filter characteristics to the signal, and means for applying a non-linear transfer function to one of the frequency bands.

The desired filter and transfer function responses can be calculated, as we are aware of the frequency response required of the pre-corrector for any given input level, by a logical design process, which is examplified in the following description of the specific embodiment.

The frequency response (see FIG. 8) for the digital pre/de emphasis is non linear for different frequency values and the response is different for each voltage value. The pre-corrector is preferably designed by choosing a non-linear transfer function for one reference frequency, such that all voltages will be correctly compensated for at the reference frequency. As two filters are provided in the precorrector, two other voltages can then be corrected for at other frequencies. The overall effect is to bring the curves shown in FIG. 8 closer to each other and the base line. With more filter functions it would be possible to provide correction for a further voltage values.

We have also found, surprisingly, that the pre-corrector can be designed to act to correct channel error as well as error due to non-complementary pre and de-emphasis characteristics.

It is envisaged that it may be possible to include a circuit in the receiver to correct for errors due to non-complementary pre and de-emphasis characteristics, instead of utilising a pre-corrector circuit. However, such a circuit would need to be adaptive, relying on monitoring of a calibration pulse transmitted to it along the signal channel in order to adapt its characteristics to provide the right correction response. Such a circuit has not yet been implemented.

BRIEF DESCRIPTION OF THE DRAWINGS

Features and advantages of the present invention will become apparent from the following description of embodiments thereof, by way of example only, in relation to HDMAC television signals, with reference to the accompanying drawings, in which;

FIG. 6 shows a family of frequency response curves for the de-emphasis network of FIG. 3 for various values of input voltage for the HDMAC signal;

FIG. 10 shows an amplitude/frequency response for non-linear digital de-emphasis as applied by the network of FIG. 7a and FIG. 9 to an HDMAC signal for various values of input voltage;

DETAILED DESCRIPTION IN THE ABSTRACT OF THE DISCLOSURE

The following description of specific embodiments of the invention relates to pre and de-emphasis carried out on HD MAC television signals.

If we consider that the C/N (Carrier/Noise) for edge of service area for standard MAC vision is 14 dB, then for an 10.125 MHZ baseband HD MAC picture, it has been shown that there is a noise penalty of approximately 5.5 dB. This is made up roughly as follows:
(a) 1.5 dB due to increase in baseband bandwidth.
(b) 2 dB due to increase in de-compression ratio.
(c) 2 dB due to reduction of viewing distance from 4 H to 3 H.

This means that at 20 dB C/N, a high quality but visibly noisy picture is expected. Due to uplink and downlink interference, the equivalent C/N ratio may not be very much about this value. In addition, it has been shown that for a MAC picture interferring into a HD-MAC picute, the protection ratio for first ACI (adjacent channel interference) falls about 6 dB short of the value required for compliance with WARC 77.

There is therefore a need for a noise reduction technique to reduce the affects of both interference and noise.

Since the MAC specification has already been defined we have the added problem that any noise reduction technique must be compatible with early receivers built to the MAC specification. By compatible we mean that picture degradiation attributable to the further noise reduction processing at the transmitter must be within acceptable limits.

Non-linear pre-emphasis is a process where the pre-emphasised vision waveform is compressed at the transmitter to reduce the peak to peak frequency deviation and de-compressed at the receiver.

In accordance with the present invention pre-emphasis is applied to the HDMAC signal by filtering the signal to split it into a high and low frequency sub-band, and the high frequency sub-band is passed through a non-linear transfer function. De-emphasis is applied at the receiver in a similar manner. This gives a processed HDMAC signal in which the noise is of an acceptable level, and also one which is compatible with existing MAC receivers, such that no appreciable degredation occurs to the conventional MAC signal due to the extra processing.

Figure 1:
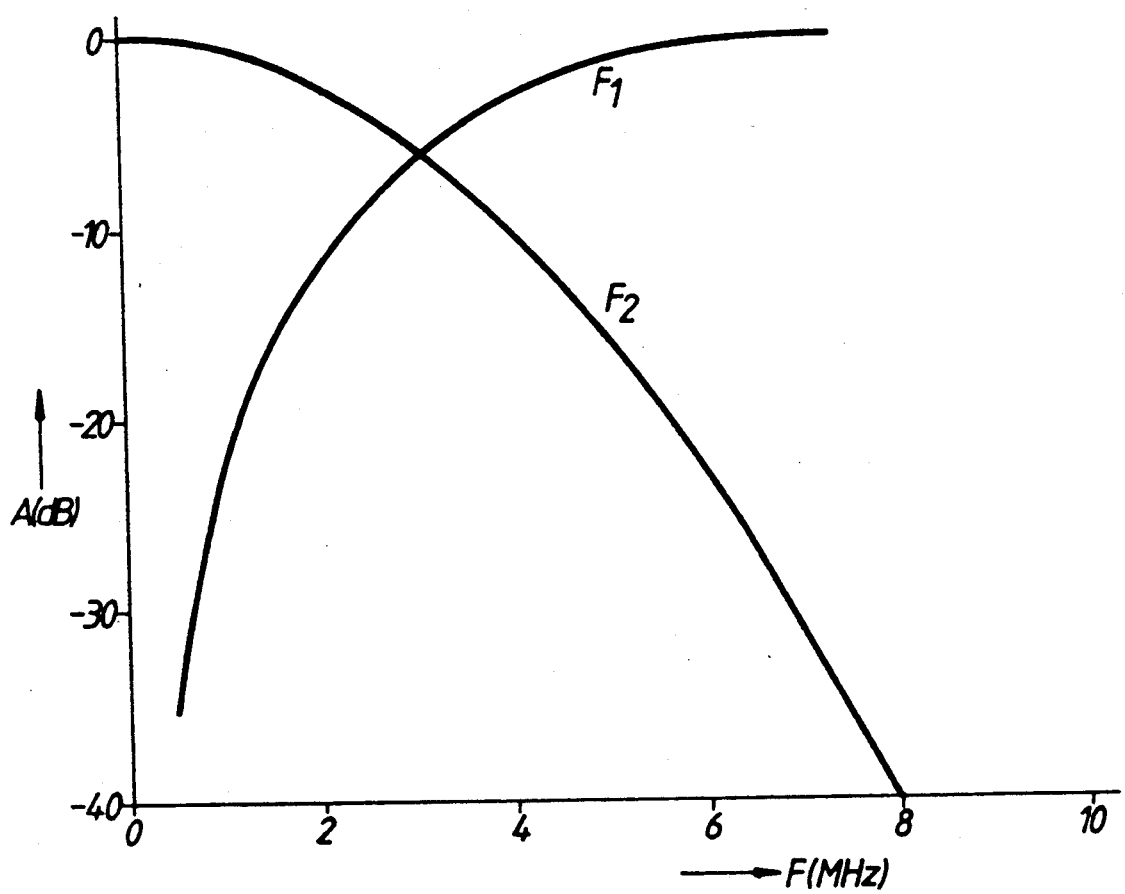
FIG. 1 shows a graph of a desired filter response for HDMAC pre and de-emphasis in accordance with the present invention, for providing high and low frequency signal sub-bands.

The type of filter responses which would be useful to produce the high and low frequency sub-bands are illustrated in FIG. 1. The responses illustrated are those of Gaussian roll-off filters which result in low overall channel distortian. It is envisaged that other types of filters may be used.

The present invention may be implemented by analogue or digital means.

The following description, with reference to FIGS. 2 to 6, relates to an analogue way of implementing the present invention.

In analogue terms, it is possible to realise the de-emphasis network by a chip and a few external components. The block diagram of the de-emphasis is shown ir FIG. 3. $F_1$ and $F_0$ are single pole high pass and low pass filters. $F_2$ is a single pole low pass filter. $N_1$ is a non-linear function.

The following equations relate to the filter characteristics;

$$F1(jw) = \frac{jw/w1}{1 + jw/w1} \text{ in } \frac{F/F1}{\sqrt{H(F/F1)^2}}$$

$$F0(jw) = \frac{1}{1 + jw/wo}$$

$$F2(jw) = \frac{1}{1 + jw/w2}$$

PROPOSED VALUES FOR HD MAC.

Figure 4:
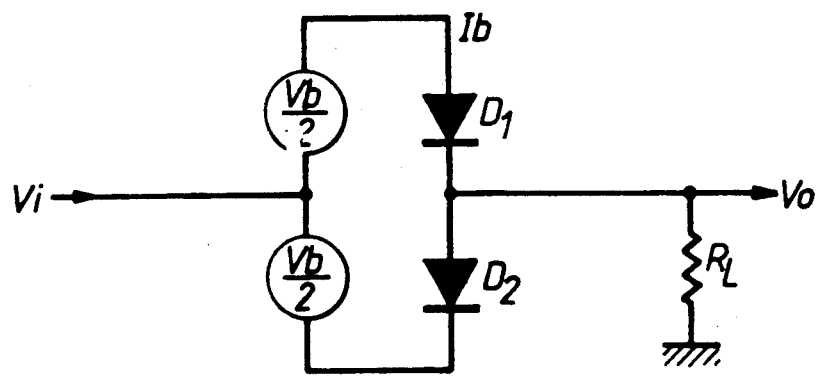
FIG. 4 shows a circuit diagram implementation of the transfer function N1 of FIG. 3.

F0 = 2.5 MHz
F1 = 3 MHz
F2 = 10.125 MHz
A = 2.0
W1, W2 = cut off frequencies of the filters The transfer function N1 may be implemented by the circuit of FIG. 4, and is described by the following equation (1);

$$V_O = V(e^{\frac{q}{KTM}(Vi-Vo)} - e^{\frac{-q}{KTM}(Vi-Vo)}) \quad (1)$$

where
Vo = voltage output from transfer function,
Vi = voltage input to transfer function
q = charge on electron
T = absoloute temperature
K = Boltzmanns constant
and V and M are shape factors.

The transfer circuit is implemented (FIG. 4) via diodes, D1 and D2, and resistor RL.

Figure 5:
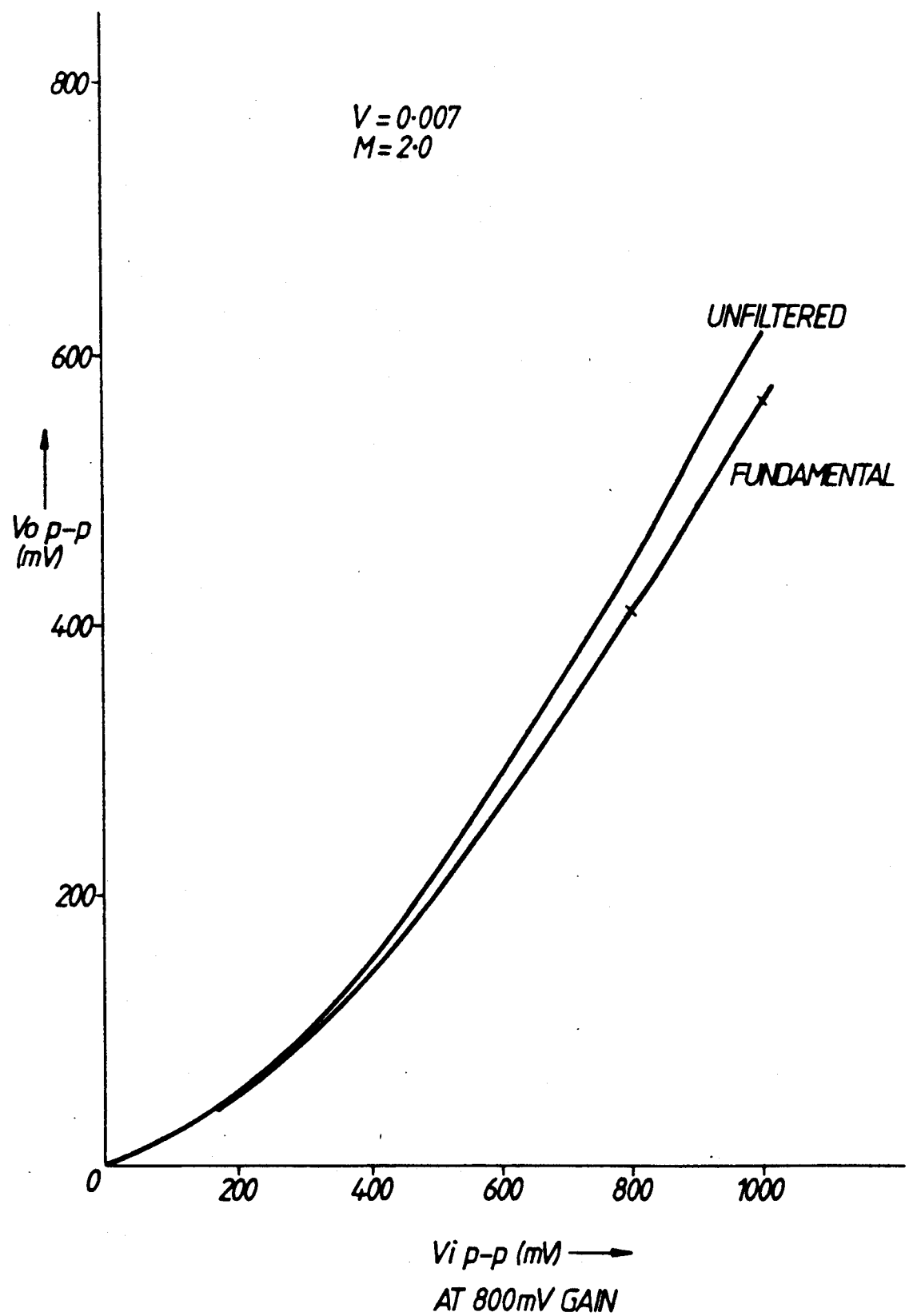
FIG. 5 shows a typical graph of voltage out against voltage in for the non-linear transfer function for analogue pre/de-emphasis of HDMAC in accordance with the present invention.

The transfer function is difficult to translate into explicit form, but it has been evaluated and a typical transfer function for HD MAC is shown in FIG. 5.

Note that FIG. 5 is expressed in terms of peak to peak voltage. If it were expressed in terms of straightforward voltage the curve would continue through the origin as a mirror immage of the curve shown, giving the 3 part transfer function (end portions having the same slope and mid portion having a different slope—see, eg. the graphical representation on N1 of FIG. 3) referred to in the preamble.

It should be noted that the effect of absolute temperature T is the same as the effect of M.

Diodes D1 and D2, and associated bias circuits may be on a chip. It is not possible to easily temperature compensate the response, so it is preferable to temperature control the chip by, eg an on-chip power transistor.

Referring again to FIG. 2 the high frequency and low frequency parts of the signal are separated by F0, F1 and the high frequency part is subjected to the non-linear transfer function N1 and then filtered by F2. Noise conversion affects due to static deviation are elimited since the non-linearity is symmetric independent of static deviation. The processed high frequency component is re-combined with the low frequency component. In the absence of the non-linear function and F2, an overall flat frequency response would be ontained by employing equal cut of frequencies F0, F1.

The function is designed to give a near flat forward frequency response for a full amplitude multiburst signal. This requires F0 to be greater than F1 due to the affect of the non-linear function. As the input level is reduced, the frequency response drops and for very small input signal attenuation is designed to be 6 dB at the top of the video baseband. This value is significant in that it is the minimum value that is expected to guarantee compliance with WARC 77.

Referring again to FIG. 5, a significant feature of the non-linear transfer function employed is that for high input levels it becomes linear. Large amplitude threshold spikes press through relatively undistorted and so there is no subjective degradation to threshold. The non-linearity has the greatest effect for low input signals.

The pre-emphasis network is defined as the inverse function of the de-emphasis network. Due to the non-linearity, it will produce out-of-band cpmponents which will be largely filtered off by the channel.

We wish to minimise the generation of harmonics by the non-linearity. In FIG. 5 two curves are shown. These are the pk to pk amplitude of the output of $N_1$ and the pk to pk amplitude of the fundamental component at the output of $N_1$. They are presented as a measure of the significance of the out-of-band components for a given choice of shape factors V and M.

As regards system design the approach taken here is to propose a set of system parameters and then to determine the system performance using these parameters. From these results the parameters can be modified in an iterative fashion.

The following parameters are proposed:

| |
|---|
| Non-linear function |
| V = 0.007 |
| M = 2.0 (Specified for T = 293° K.) |
| De-emphasis network |
| $F_0$ = 2.5 MHz |
| $F_1$ = 3.0 MHz |
| $F_2$ = 10.125 MHz |
| A = 2.0 |

FIG. 6 shows the family of frequency response curves which is achieved using these parameters. For a IV p-p input level, we would ideally like a flat frequency response. The curve shows a variation of ±0.6 dB. This is not considered to be of particular significance but it is possible to reduce the ripple by employing a more complicated function for $F_2$. In terms of the overal system frequency response it is of no consequence at all, since the pre- and de-emphasis functions are complementary.

The curves are designed to provide a nominal 6 dB attenuation for low input levels at 9.46 MHz. This is the lowest frequency for static interfering tones (1st A.C.I.).

The full noise improvement is obtained for signals of −20 dB or less. The level of the first ACI static tone has been calculated to be approximately −20 dB for an interferer at the WARC 77 worst case limit, so that a full 6 dB improvement is obtained. For very high noise levels, the noise improvement will reduce, and for this reason it is important to include a band limiting filter between the FM demodulator and the de-emphasis processing. Under these conditions, practical tests have shown the system to be still effective for C/N ratios down to 5 dB. For a test signal consisting of a full amplitude high frequency grating there will be no noise improvements, but under these conditions, the noise is subjectively less noticable.

Figure 2:
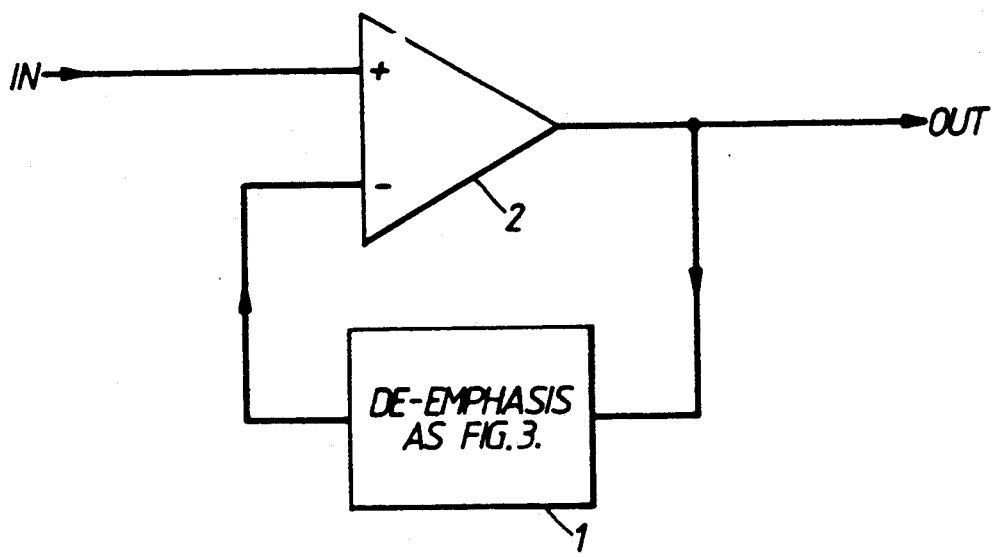
FIG. 2 shows a schematic block diagram of an analogue network for providing pre-emphasis in accordance with the present invention, to an HDMAC signal.
Figure 3:
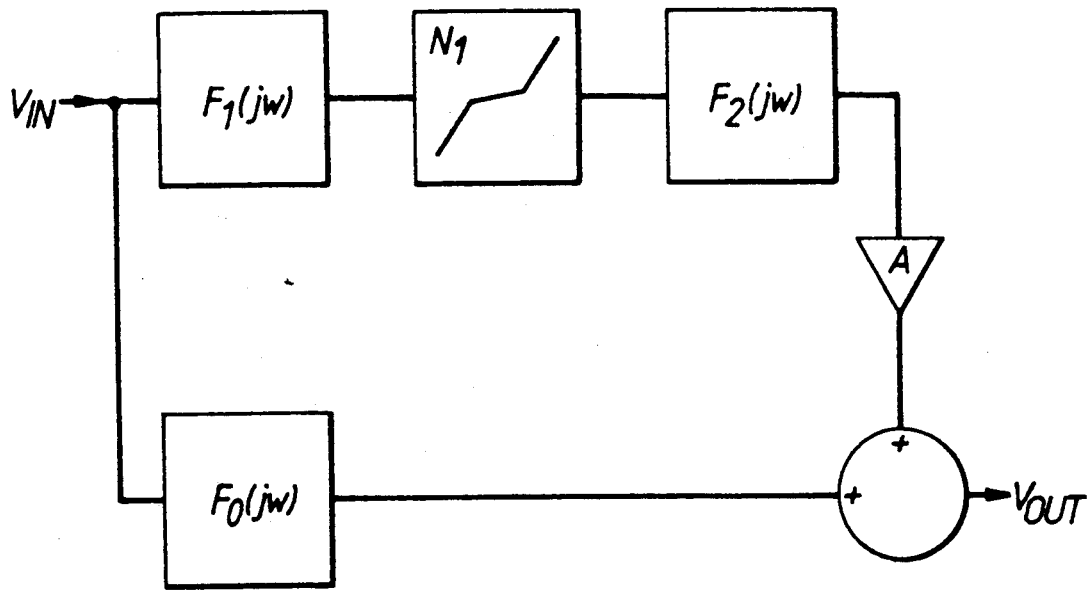
FIG. 3 shows a schematic block diagram of an analogue non-linear de-emphasis network for providing de-emphasis to an HDMAC signal output from a network such as illustrated in FIG. 2.

A pre-emphasis network is illustrated in FIG. 2. A de-emphasis network is placed in a feedback loop to an amplifier 2, the de-emphasis network 1 having the same characteristics as the de-emphasis network which is utilised to provide the actual de-emphasis (FIG. 3). The signal to be pre-emphasised is input to the amplifier 2 and the pre-emphasised signal is taken from the output of the amplifier 2. So long as the loop is stable, and so long as the loop bandwidth is sufficiently high, the the pre-emphasis function is accurately generated.

As briefly mentioned above, out of band components will be produced. The non-linear de-emphasis network will produce out of band components in response to a band-limited input signal. The pre-emphasis network implemented as in FIG. 2 will therefore also produce out of band components. These components will be largely removed by the FM channel with the following consequences:

(1) The overall frequency response of the system will not be flat.

(2) For 20.25 MHz samples/sec sampled analgoue transmission, the affect of removing the out of band components will be to generate inter-sample interference.

This problem can be reduced by the inclusion of low pass filter F2 in FIG. 3. The affect of this is to attenuate the out of band components produced by the de-emphasis network. As a consequence of this, the out of band components produced by the pre-emphasis network of FIG. 2 are also reduced. Due to stability considerations for the pre-emphasis feedback loop, this filter can at the most produce a 2 pole roll off.

As regards compatibility with conventional MAC receivers if the vision signal is pre-emphasised but not de-emphasised (as would be the case if the signal were being received by a conventional MAC receiver) then high level information remains largely undistorted. Low level detail is however, increased. Subjectively, this has a "crispening" effect, which for clean source material is not a problem.

The following description with reference to FIGS. 7 to 15, relates to a digital way of implementing the present invention.

Figure 7A:
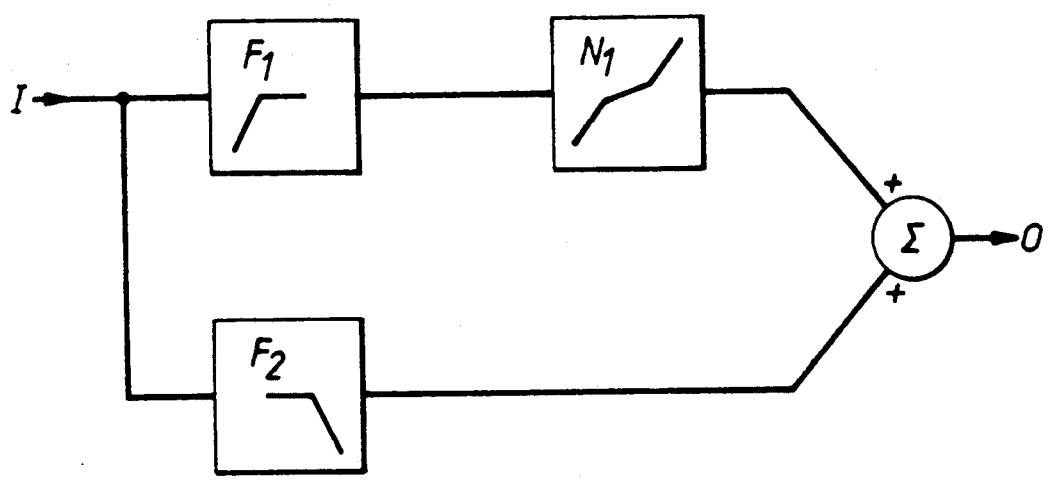
FIG. 7a shows a schematic block diagram of a digital implementation of a de-emphasis function in accordance with the present invention for HDMAC.
Figure 7B:
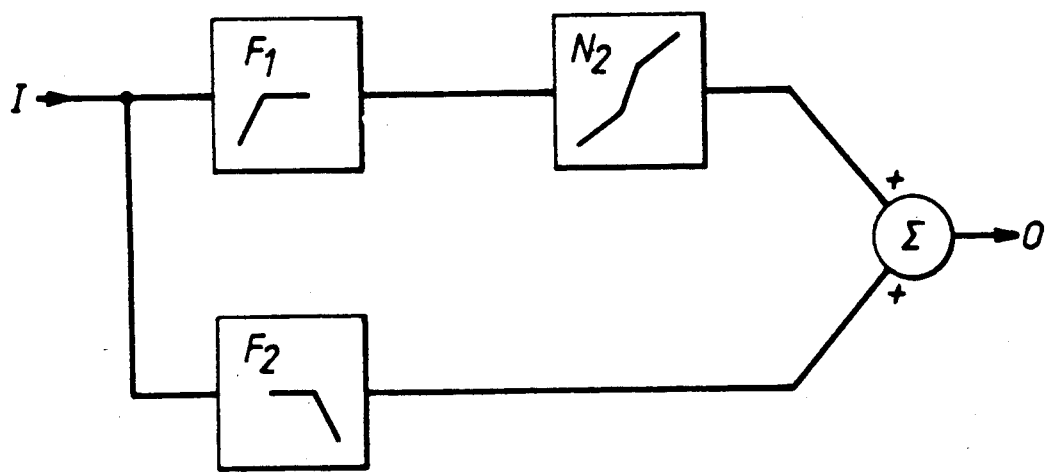
FIG. 7b shows a schematic block diagram of a digital pre-emphasis function in accordance with the present invention for HDMAC.

FIGS. 7a and 7b illustrate, in schematic block diagram form, digital circuit implementation of the pre-emphasis and de-emphasis characteristics in accordance with the present invention.

With reference to FIG. 7a, the de-emphasis function, is provided by high and low pass filters $F_1$, $F_2$ (which may have the same characteristics as those illustrated in FIG. 1), which may be digital filters, and a non-linear transfer function N1, which also may be implemented digitally.

The pre-emphasis function (FIG. 7b) is provided by corresponding filters, F1, F2, and a transfer function N2, which may be implemented digitally.

The non-linear function N2 is the inverse of the non-linear function N1.

The basic configuration is the same for pre-emphasis and de-emphasis. By using separate filters F1, F2, the maximum flexibility is obtained in the overall design. Under some circumstances it may be possible to make filters F1, F2, truly complimentary in order to simplify hardware design. A single filter only is then require as shown in the embodiments illustrated in FIGS. 14 and 15.

Figure 8:
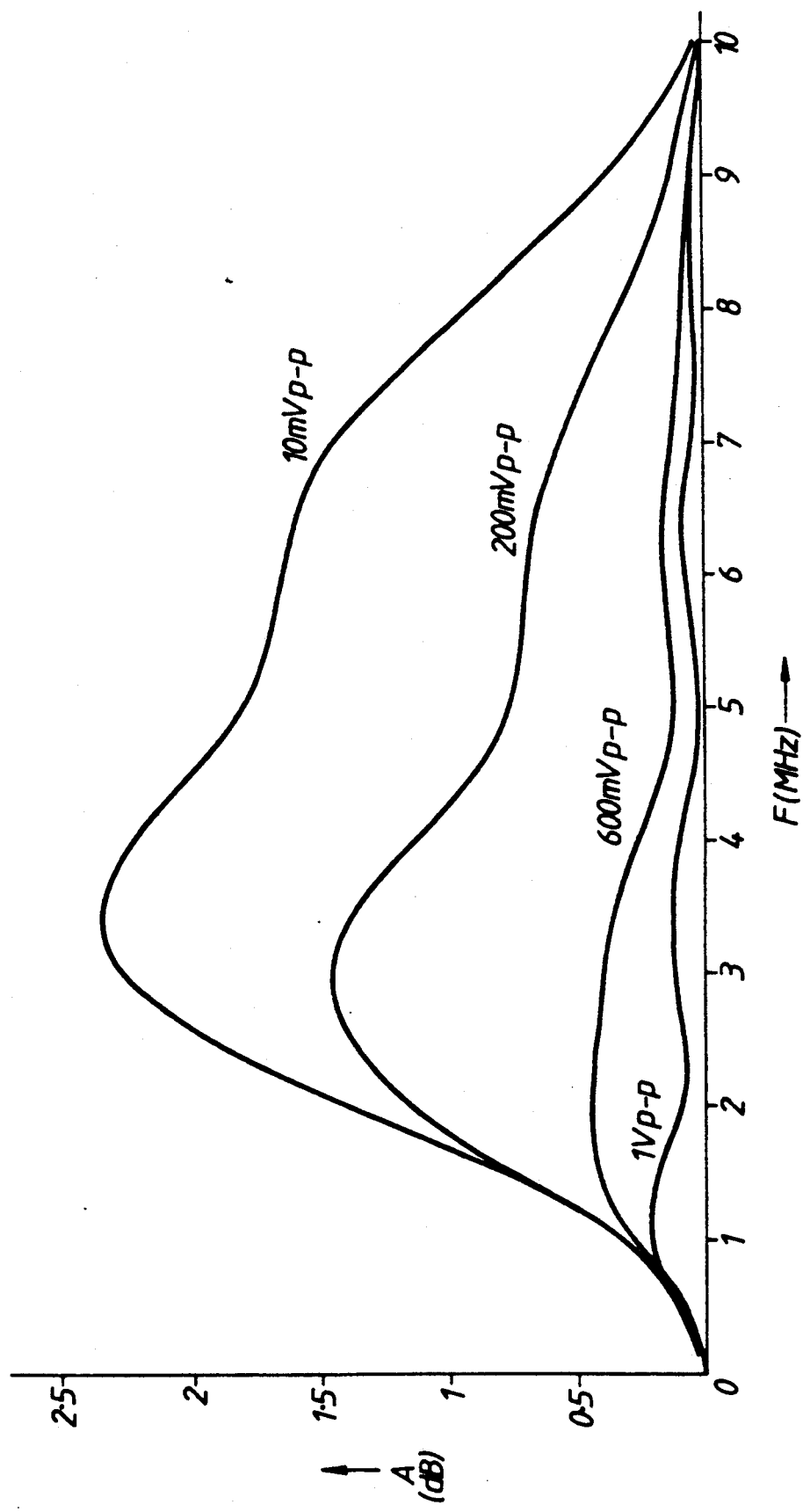
FIG. 8 shows a typical amplitude/frequency response for digital pre- and de-emphasis in accordance with the present invention, applied to HDMAC.

Referring again to FIGS. 7a and 7b. The pre and de-emphasis functions should ideally be truly complementary. With this implementation however, true complementation is theoretically not possible, and the implementation results only in an approximation to the ideal. Considering the performance of the functions 7a, 7b connected back to back, then it is clear that for very low frequencies and for very high frequencies the combination will be transparent, since F1, F2 are high pass and low pass filters. At frequencies in the cross-over region between F1, F2, it is clear that there will be some error. FIG. 8 shows a typical amplitude/frequency response for the digital pre and de-emphasis total response.

By suitably choosing filter coefficients, the error can be reduced to some extent.

For video signals the consequence of the error may not be significant subjectively. However, for HD-MAC, the consequence of this error is to produce inter-sample interference and this must be minimised. In order to achieve this a pre-corrector is proposed. This is a function which modifies either the input to or the output from the pre-emphasis function so as to reduce the overall back-to-back error. It is chosen to be at the transmitter to minimise receiver complexity.

A pre-corrector function placed prior to the pre-emphasis function is shown in FIG. 5, which is a schematic block diagram of an overall system implemented digitally. The pre-corrector here is of the same configuration as the pre- and de-emphasis networks. In this case, however, F3 would typically be a bandpass filter with zero response at dc and at the top of the baseband. F4 would typically be a near complimentary band stop filter with unity response at dc and at the top of the baseband.

Figure 12:
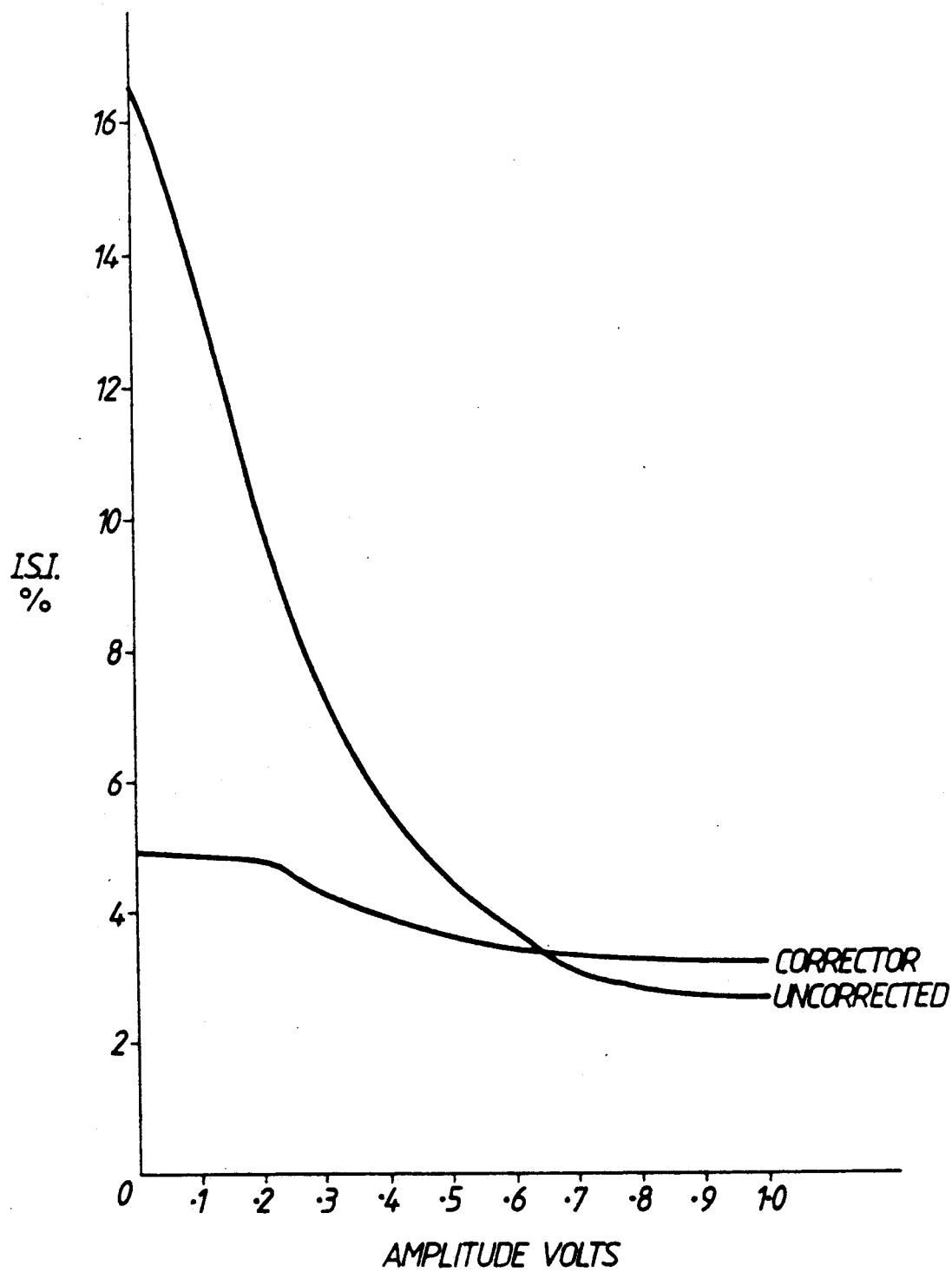
FIG. 12 shows a graph illustrating the effect on intersample intereference of the pre-correction in accordance with the present invention.

The effectiveness of such a pre-corrector can be seen from FIG. 12 which indicates the level of ISI generated by the system with and without pre-correction.

The design of the pre-corrector network will be described in the following. However, first it is considered advantageous to define what we mean by out inter sample interference (ISI), for HD MAC TV signals.

The Fm channel is non-linear, so ISI will be level dependent. A single value of ISI will therefore not be sufficient, and it will be necessary to specify ISI for various signal levels.

Figure 11:
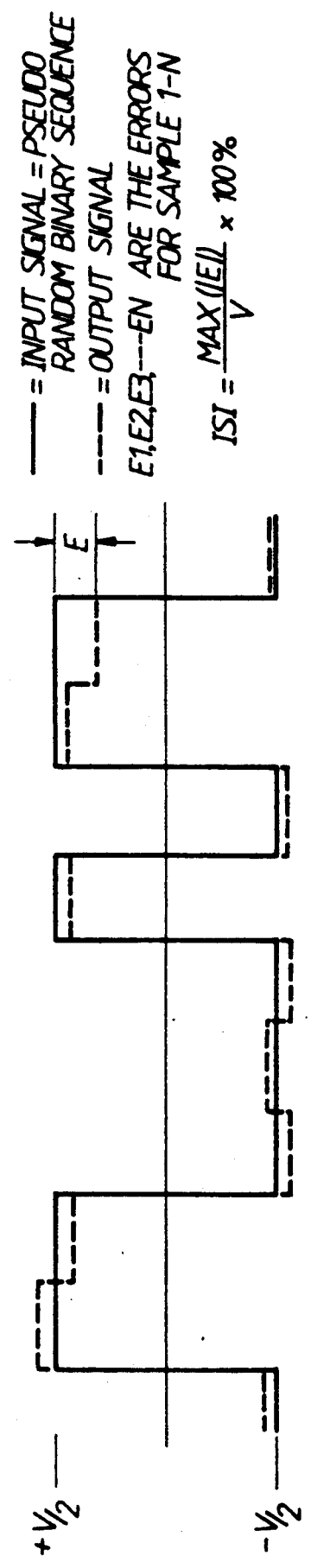
FIG. 11 shows a graph used to provide a definition for intersample interference.

FIG. 11 shows the definition used in this paper. Here the test signal is a pseudo-random binary sequence of amplitude v pk-pk. The inter-sample interference is defined as the maximum value of the modulus of the error, expressed as a percentage of the pk to pk test signal amplitude. The test signal is symmetrical about mid-grey level.

The error is defined as the difference between the sample value at the output of the test system and the sample value which would result as calculated from the dc gain of the test system.

Figure 13:
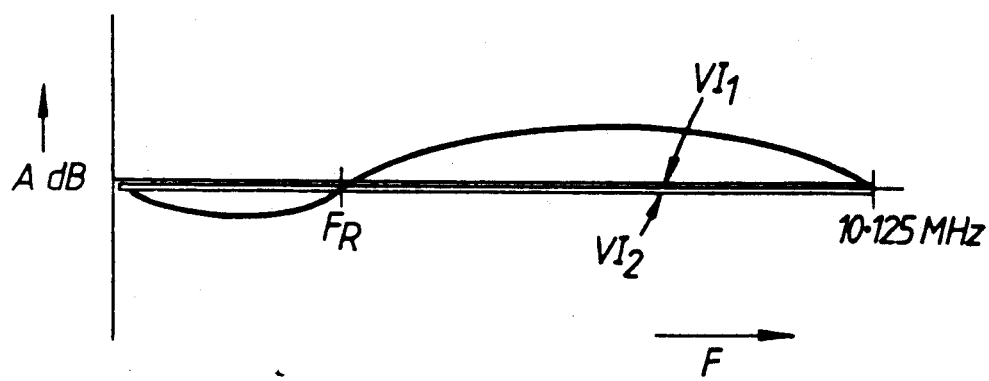
FIG. 13 illustrates the form of the achievable frequency response when utilising a pre-corrector in accordance with the present invention.
Figure 14:
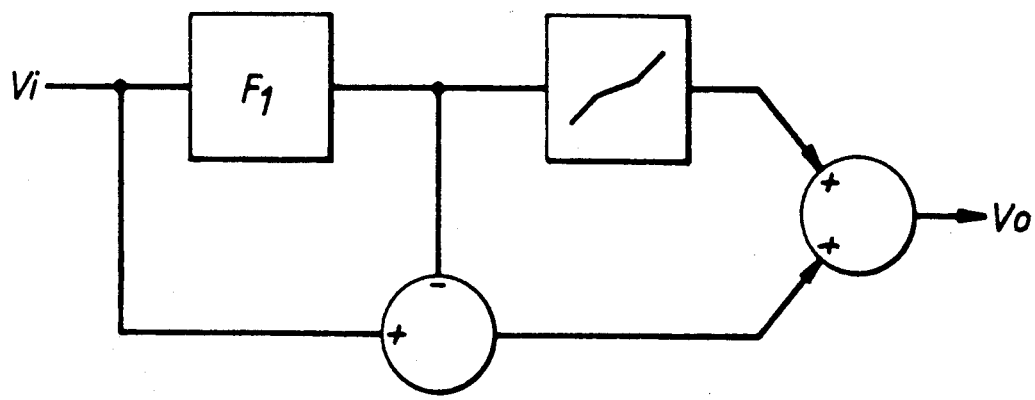
FIG. 14 shows a schematic block diagram of a digital pre/de-emphasis network in accordance with the present invention utilising a single filter configuration.
Figure 15:
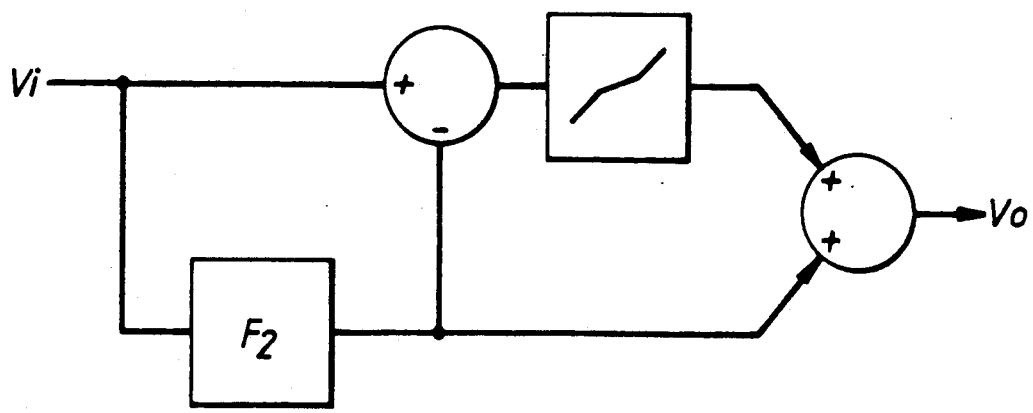
FIG. 15 shows a further schematic block diagram of a digital pre/de emphasis network in accordance with the present invention utilising a single filter configuration.

The design of the pre-corrector network is explained in the following, with reference to FIG. 13.

We know the frequency response required of the pre-corrector for any given input level. We wish to calculate the filter responses F3 and F4 and the non linear function N required to produce the best approximation to this.

Firstly we choose a reference frequency FR. This will normally be the frequency at which the most correction is required (typically 3 MHz).

Let the gain of F3 at FR be F3 (FR).
Let the gain of F4 at FR be F4 (FR).

The choice of F3 (FR) will not affect the final result, except if the output of F1 exceeds its allowable number range. F3 (FR) is chosen arbitarily with this consideration in mind.

The choice of F4 (FR) will affect the final result. F(R) and F4(R) are the only variables in the design process. The design process is repeated for a range of values FR and F4 (FR). The ISI/amplitude curve is calculated for each result and the best compromise chosen.

DESIGN PROCESS

Consider two possible input voltages VII and V12.
Let the output voltage required for VII be VO(VII).
Let the output voltage required for V12 be VO(VI2).
Let the gain of N for input V be N (V).
Let F3(F), F4(F) represent the gains of F3, F4 at frequency F. Then we can say from FIG. 13 that at any given spot frequency F.

$$VII \times [(F3(F) \times N(F3 \times VII) + F4(F)] = VO(VII) \quad (1)$$

Similarly $$V12 \times [(F3(F) \times N(F1 \times V12) + F4(F)] = VO(V12)$$

We have two simultaneous equations which we can solve for F1(F), F2(F). Rearranging and subtracting we get $$F3(F) \times [N(F3 \times VII) - N(F3 \times V12)] = G\text{-}(VII) - G(V12) \quad (2)$$

where G(VI1), G(VI2) are the values of gain required of the corrector at frequency F and levels VI1, V23 respectively.

Equation (2) is easily solved for F3(F) by an interation process.

Having calculated F3(F), F4(F) is calculated from equation (1).

The overall design process is as follows:
(1) Calculate the gain required of the corrector at frequency FR, for equal steps of input level from 0 to IV p-p.
(2) Taking values F3(FR), F4(FR) calculate the gain required of N for equal steps of its own input level, ie calculate the required input/output characteristic of N.
(3) Having determined N, then for discrete frequencies F over the range 0 to 10.125 MHZ, calculate F3(F), F4(F) as described above.
(4) Calculate the coefficients required for F3, F4 in order to match the discrete sample values F3(F), F4(F) over the range 0−10.125 MHz.

The form of frequency response resulting from this design process is shown in FIG. 6b. It is flat for input levels VI1, VI2. (This is a direct result of solving the simultaneous equations). At all other input levels, the response is guaranteed to be 0dB at the reference frequency FR.

In practice, VI1 is chosen to be 1Vp-p. The guarantees that a 1Vp-p multiburst test signal will not result in over deviation of the carrier. (In the case of pseudo random sample there will still be some small over deviation). V12 is chosen as 0.2p-p. At this level, contributions to ISI from other sources are small, so the contribution from E7 should be minimised.

This logical design process may easily be applied by a computer program.

A surprising effect of the pre-corrector is that it can also be designed to correct for intersample interference produced by the r.f. channel in a satellite T.V. system.

Other forms of pre-corrector are possible.

Figure 9:
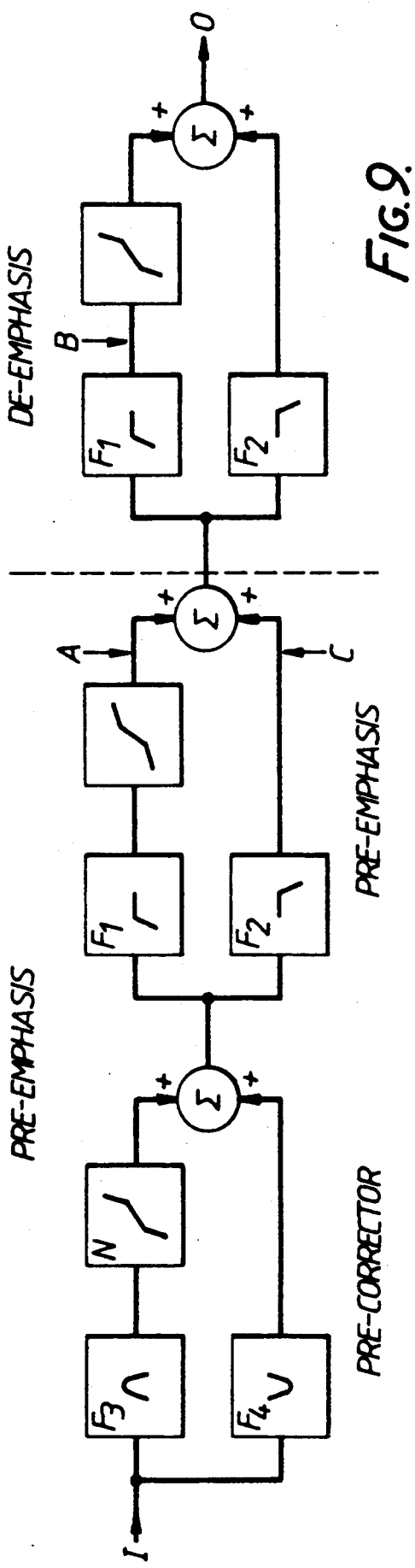
FIG. 9 shows a schematic block diagram of a digital pre and de-emphasis network for HDMAC, including a pre-corrector network in accordance with the present invention, prior to the pre-emphasis network.

FIG. 6 shows a frequency response for the de-emphasis network of FIG. 9.

It is believed that the present invention will advantageously provide the following:
(a) 3–4 dB noise improvement to a 10 MHz channel.
(b) 6dB interference suppression (first ACI static tones) to allow WARC 77 compatability.
(c) a 'reasonable' degree of compatibility with a 'simple' receiver.
(d) No detrimental affect on FM threshold.

Note the present invention can also be used for other high definition signals than HD MAC, such as W MAC, for example.

Please note that the present invention also may provide a pre-corrector which is arranged to correct for intersample interference produced by the r.f. channel in a television signal transmission and reception system.

What is claimed is:

1. A method of processing a high definition television signal, comprising the steps of:
    filtering the signal to provide a high frequency sub-band and a low frequency sub-band;
    applying a non-linear pre-emphasis signal to the high frequency sub-band;
    recombining and transmitting the signal;
    receiving the signal;
    filtering the received signal to provide high frequency and low frequency sub-bands;
    applying a complementary non-linear de-emphasis to the high frequency sub-band; and wherein
    the processing is carried out by analoq circuitry means;
    the steps of filtering the signal and applying pre-emphasis are carried out by the single step of applying the signal to a feedback loop, the feedback loop including a characteristic corresponding to the filtering and de-emphasis to be applied to the received signal.

2. A method in accordance with claim 1 and including the further step of filtering the de-emphasized signal to attenuate out of band components.

3. A method of processing in accordance with claims 1 and wherein the non-linear characteristic is arranged such that its effect is symmetric independent of static deviation.

4. A method of processing in accordance with claim 1 and wherein the non-linear pre-emphasis is of the form:

$$VO = Ve^{(q/KTM)(Vi-VO)} - Ve^{-(q/KTM)(Vi-VO)}$$

(where Vi is the input voltage; VO is the output voltage; q is the electron charge; K is Boltzman's constant T is absolute temperature; and V and M are shape factors).

5. A method of processing in accordance with claim 2 and wherein the non-linear pre-emphasis is of the form:

$$VO = Ve^{(q/KTM)(Vi-VO)} - Ve^{-(q/KTM)(Vi-VO)}$$

(where Vi is the input voltage; VO is the output voltage; q is the electron charge; K is Boltzman's constant T is absolute temperature; and V and M are shape factors).

6. A method of processing in accordance with claim 3 and wherein the non-linear pre-emphasis is of the form:

$$VO = Ve^{(q/KTM)(Vi-VO)} - Ve^{-(q/KTM)(Vi-VO)}$$

(where Vi is the input voltage; VO is the output voltage; q is the electron charge; K is Boltzman's constant T is absolute temperature; and V and M are shape factors).

7. A method of processing in accordance with claim 2 and wherein the non-linear characteristic is arranged such that its effect is symmetric independent of static deviation.

8. A method of processing in accordance with claim 7 and wherein the non-linear pre-emphasis is of the form:

$$VO = Ve^{(q/KTM)(Vi-VO)} - Ve^{-(q/KTM)(Vi-VO)}$$

(where Vi is the input voltage; VO is the output voltage; q is the electron charge; K is Boltzman's constant T is absolute temperature; and V and M are shape factors).

9. A method of processing a high definition television signal, comprising the steps of:
    filtering the signal to provide a high frequency sub-band and a low frequency sub-band;
    applying a non-linear pre-emphasis signal to the high frequency sub-band;
    recombining and transmitting the signal;
    receiving the signal;
    filtering the received signal to provide high frequency and low frequency sub-bands;
    applying a complementary non-linear de-emphasis to the high frequency sub-band; and wherein
    the processing is carried out by digital circuitry means; and further comprising the step applying pre-correction prior to filtering and pre-emphasis to compensate for errors due to the pre and de-emphasis characteristics being non-complementary.

10. A method of processing in accordance with claim 9 and wherein the pre-correction applied is also designed to correct for intersample interference produced by the channel along which the signal is transmitted.

11. A method of processing in accordance with claim 9 and wherein the non-linear characteristic is arranged such that its effect is symmetric independent of static deviation.

12. A method of processing in accordance with claim 9 and wherein the non-linear pre-emphasis is of the form:

$$VO = Ve^{(q/KTM)(Vi-VO)} - Ve^{-(q/KTM)(Vi-VO)}$$

(where Vi is the input voltage; VO is the output voltage; q is the electron charge; K is Boltzman's constant T is absolute temperature; and V and M are shape factors).

13. A method of processing in accordance with claim 10 and wherein the non-linear pre-emphasis is of the form:

$$VO = Ve^{(q/KTM)(Vi-VO)} - Ve^{-(q/KTM)(Vi-VO)}$$

(where Vi is the input voltage; VO is the output voltage; q is the electron charge; K is Boltzman's constant T is absolute temperature; and V and M are shape factors).

14. A method of processing in accordance with claim 11 and wherein the non-linear pre-emphasis is of the form:

$$VO = Ve^{(q/KTM)(Vi-VO)} - Ve^{-(q/KTM)(Vi-VO)}$$

(where Vi is the input voltage; VO is the output voltage; q is the electron charge; K is Boltzman's constant T is absolute temperature; and V and M are shape factors).

15. A method of processing in accordance with claim 10 and wherein the non-linear characteristic is arranged such that its effect is symmetric independent of static deviation.

16. A method of processing in accordance with claim 15 and wherein the non-linear pre-emphasis is of the form:

$$VO = Ve^{(q/KTM)(Vi-VO)} - Ve^{-(q/KTM)(Vi-VO)}$$

(where Vi is the input voltage; VO is the output voltage; q is the electron charge; K is Boltzman's constant T is absolute temperature; and V and M are shape factors).

17. A transmitter circuit for a high definition television signal, the circuit comprising:
filter means arranged to split the signal into high and low frequency sub-bands:
means for applying a non-linear pre-emphasis to the signal, the non-linear pre-emphasis characteristic being arranged to be complementary to a non-linear de-emphasis characteristic to be applied at the receiver end; and wherein
the circuit provides analog processing; and
the filter means and means for applying non-linear pre-emphasis comprise a feedback loop into which the signal is input, the feedback loop including circuit means for filtering the feedback signal and applying a non-linear de-emphasis thereto, the non-linear de-emphasis being complementary to the pre-emphasis characteristic being applied.

18. A transmitter circuit in accordance with claim 17 and wherein the non-linear pre-emphasis is of the form:

$$VO = Ve^{(q/KTM)(Vi-VO)} - Ve^{-(q/KTM)(Vi-VO)}$$

(where Vi is the input voltage; VO is the output voltage; q is the electron charge; K is Boltzman's constant T is absolute temperature; and V and M are shape factors).

19. A transmitter circuit for a high definition television signal, the circuit comprising:
filter means arranged to split the signal into high and low frequency sub-bands:
means for applying a non-linear pre-emphasis to the signal, the non-linear pre-emphasis characteristic being arranged to be complementary to a non-linear de-emphasis characteristic to be applied at the receiver end; and wherein
the circuit provides digital processing; and further comprising:
pre-corrector circuitry for applying a pre-correction function to the signal before filtering and pre-emphasis to compensate for errors.

20. A transmitter circuit in accordance with claim 19 and wherein the pre-corrector circuitry comprises means for filtering the signal to provide at least two frequency bands; means for applying a non-linear function to one of the bands; and means for recombining the frequency bands.

21. A transmitter circuit in accordance with claim 19 and wherein the means for applying a non-linear pre-emphasis to the signal also applies a function of the form:

$$VO = Ve^{(q/KTM)(Vi-VO)} - Ve^{-(q/KTM)(Vi-VO)}$$

(where Vi is the input voltage; VO is the output voltage; q is the electron charge; K is Boltzman's constant T is absolute temperature; and V and M are shape factors).

22. A method of processing in accordance with claim 20 and wherein the non-linear pre-emphasis is of the form:

$$VO = Ve^{(q/KTM)(Vi-VO)} - Ve^{-(q/KTM)(Vi-VO)}$$

(where Vi is the input voltage; VO is the output voltage; q is the electron charge; K is Boltzman's constant T is absolute temperature; and V and M are shape factors).

* * * * *